United States Patent
Hinotsu et al.

(10) Patent No.: US 9,914,845 B2
(45) Date of Patent: Mar. 13, 2018

(54) FINE SILVER PARTICLE DISPERSING SOLUTION

(71) Applicant: DOWA ELECTRONICS MATERIALS CO., LTD., Tokyo (JP)

(72) Inventors: Takashi Hinotsu, Okayama (JP); Tomonori Shibayama, Okayama (JP); Hiromasa Miyoshi, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 0 days.

(21) Appl. No.: 15/101,014

(22) PCT Filed: Dec. 4, 2014

(86) PCT No.: PCT/JP2014/082771
§ 371 (c)(1),
(2) Date: Jun. 2, 2016

(87) PCT Pub. No.: WO2015/087943
PCT Pub. Date: Jun. 18, 2015

(65) Prior Publication Data
US 2016/0297982 A1     Oct. 13, 2016

(30) Foreign Application Priority Data

Dec. 10, 2013  (JP) .................. 2013-255191
Apr. 9, 2014   (JP) .................. 2014-079824
Oct. 20, 2014  (JP) .................. 2014-213600

(51) Int. Cl.
| | | |
|---|---|---|
| C09D 11/52 | (2014.01) |
| C09D 11/033 | (2014.01) |
| H01B 1/22 | (2006.01) |
| B22F 9/24 | (2006.01) |
| C09C 1/62 | (2006.01) |
| B22F 1/00 | (2006.01) |
| C09D 11/037 | (2014.01) |
| C09D 11/322 | (2014.01) |
| C09D 11/36 | (2014.01) |

(52) U.S. Cl.
CPC ............ *C09D 11/52* (2013.01); *B22F 1/0022* (2013.01); *B22F 1/0062* (2013.01); *B22F 1/0074* (2013.01); *B22F 9/24* (2013.01); *C09C 1/62* (2013.01); *C09D 11/033* (2013.01); *C09D 11/037* (2013.01); *C09D 11/322* (2013.01); *C09D 11/36* (2013.01); *H01B 1/22* (2013.01); *B22F 1/0018* (2013.01)

(58) Field of Classification Search
None
See application file for complete search history.

(56) References Cited

U.S. PATENT DOCUMENTS

| | | | | |
|---|---|---|---|---|
| 2009/0136770 A1* | 5/2009 | Hirakoso | .............. | B22F 1/0022 428/457 |
| 2011/0143051 A1* | 6/2011 | Ohashi | .............. | C09D 11/0235 427/553 |
| 2011/0151110 A1* | 6/2011 | St. John | .............. | C09D 11/322 427/58 |
| 2013/0153835 A1 | 6/2013 | Hinotsu et al. | | |
| 2013/0270490 A1* | 10/2013 | De La Vega | .......... | B22F 1/0022 252/514 |
| 2015/0083474 A1* | 3/2015 | Kawamura | ............ | H05K 1/097 174/257 |

FOREIGN PATENT DOCUMENTS

| | | |
|---|---|---|
| JP | 2009-138242 A | 6/2009 |
| JP | 2010-177084 A | 8/2010 |
| WO | 2011/155615 A1 | 12/2011 |
| WO | WO 2013157514 A1 * 10/2013 ............. H05K 1/097 |

OTHER PUBLICATIONS

Chemical Land 21's entry for "n-Butyl Methacrylate"; the Internet Archive Wayback Machine shows that it was publicly available on Jan. 15, 2010; entry was accessed online at the web address http://www.chemicalland21.com/industrialchem/functional%20Monomer/n-BUTYL%20METHACRYLATE.htm.*
Dow: Glycol Ethers; published by the Dow Chemical Company out of Midland, Michigan, published in Nov. 2001, cover pages then is numbered as pp. 1-26; accessible online at http://msdssearch.dow.com/PublishedLiteratureDOWCOM/dh_0032/0901b80380032bc8.pdf?filepath=oxysolvents/pdfs/noreg/110-00965.pdf&fromPage=GetDoc.*
European Search Report dated Dec. 9, 2016 for European Application No. 14869414.4.
Doruk O. Yener etal, "Synthesis of Nanosized Silver Platelets in Octylamine-Water Bilayer Systems", Langmuir, vol. 18, No. 22, Oct. 1, 2002, pp. 8692-8699.
Xiong Jing et al., "One-step route for the synthesis of monodisperse aliphatic amine-stabilized silver nanoparticles", Colloids and Surfaces A: Physiochemical and Engineering Aspects, Elsevier, Amsterdam, NL, vol. 423, Feb. 11, 2013, pp. 89-87.

* cited by examiner

*Primary Examiner* — Katie L Hammer
(74) *Attorney, Agent, or Firm* — Bachman & LaPointe, PC

(57) ABSTRACT

There is produced a fine silver particle dispersing solution which contains: fine silver particles (the content of silver in the fine silver particle dispersing solution is 30 to 90% by weight), which have an average primary particle diameter of 1 to 100 nm and which are coated with an amine having a carbon number of 8 to 12, such as octylamine, serving as an organic protective material; a polar solvent (5 to 70% by weight) having a boiling point of 150 to 300° C.; and an acrylic dispersing agent (1.5 to 5% by weight with respect to the fine silver particles), such as a dispersing agent of at least one of acrylic acid ester and methacrylic acid ester.

10 Claims, No Drawings

FINE SILVER PARTICLE DISPERSING SOLUTION

TECHNICAL FIELD

The present invention relates generally to a fine silver particle dispersing solution. More specifically, the invention relates to a fine silver particle dispersing solution used for forming fine electrodes and circuits of electronic parts and so forth.

BACKGROUND ART

Conventionally, in order to form fine electrodes and circuits of electronic parts and so forth, it is known that a conductive ink containing fine silver particles (silver nanoparticles) having particle diameters of a few nanometers to tens nanometers dispersed in a dispersing medium, or a conductive paste made into a paste after mixing silver nanoparticles with a binder resin and a solvent, is applied on a substrate, and then, heated at a low temperature of about 100 to 200° C. to be burned to sinter the fine silver particles with each other to form a silver conductive film.

Such fine silver particles for use in conductive inks and conductive pastes have a very high activity and are easy to proceed the sintering thereof even at a low temperature, so that they are unstable particles as they are. For that reason, in order to prevent the sintering and aggregation of fine silver particles with each other to ensure the independence and preservation stability of the fine silver particles, it is known that fine silver particles coated with an organic protective material of an organic compound are dispersed in a dispersing medium to be preserved as a fine silver particle dispersing solution.

As fine silver particles which are coated with an organic protective material and which can be used for such a fine silver particle dispersing solution, there are proposed silver particles which have an average particle diameter of 3 to 20 nm and which are coated with an organic protective material of a primary amine having a carbon number of 6 to 12 (see, e.g., Japanese Patent Laid-Open No. 2009-138242).

However, the fine silver particles coated with an organic protective material, such as a primary amine, as proposed in Japanese Patent Laid-Open No. 2009-138242, are hydrophobic, so that they are aggregated in a polar solvent to have a bad dispersion therein. For that reason, there is a problem in that the viscosity of a fine silver particle dispersing solution containing such fine silver particles dispersed in a polar solvent is increased, so that the resistance of a silver conductive film is increased if such a fine silver particle dispersing solution is used for producing the silver conductive film. On the other hand, the fine silver particles coated with such an organic protective material have a good dispersion stability in a nonpolar solvent. However, if the fine silver particle dispersing solution containing the fine silver particles dispersed in a nonpolar solvent, together with a resin binder, is used for producing a conductive paste, there is a problem in that the nonpolar solvent generally has a bad compatibility with the resin binder, so that it is not possible to dissolve the resin binder therein.

DISCLOSURE OF THE INVENTION

It is therefore an object of the present invention to eliminate the aforementioned problems and to provide a fine silver particle dispersing solution which has a good dispersion stability of fine silver particles even if a polar solvent is used, the fine silver particle dispersing solution having a good preservation stability and a suitable viscosity, and the fine silver particle dispersing solution being capable of being sintered at a low temperature and capable of producing a silver conductive film having a low resistance.

In order to accomplish the aforementioned and other objects, the inventors have diligently studied and found that it is possible to produce a fine silver particle dispersing solution which has a good dispersion stability of fine silver particles even if a polar solvent is used, the fine silver particle dispersing solution having a good preservation stability and a suitable viscosity, and the fine silver particle dispersing solution being capable of being sintered at a low temperature and capable of producing a silver, conductive film having a low resistance, if fine silver particles coated with an amine having a carbon number of 8 to 12 as an organic protective material, together with an acrylic dispersing agent, the amount of which is 1.5 to 5% by weight with respect to that of the fine silver particles, are added to a polar solvent having a boiling point of 150 to 300° C.

According to the present invention, there is provided a fine silver particle dispersing solution comprising: a polar solvent having a boiling point of 150 to 300° C.; fine silver particles coated with an amine having a carbon number of 8 to 12 as an organic protective material, the fine silver particles being added to the polar solvent; and an acrylic dispersing agent added to the polar solvent, the content of the acrylic dispersing agent being 1.5 to 5% by weight with respect to that of the fine silver particles.

In this fine silver particle dispersing solution, the amine is preferably octylamine. The fine silver particles preferably have an average primary particle diameter of 1 to 100 nm. The polar solvent having the boiling point of 150 to 300° C.; is preferably a glycol ether solvent or terpineol. The glycol ether solvent is preferably diethylene glycol monobutyl ether, diethylene glycol dibutyl ether or diethylene glycol monobutyl ether acetate. The acrylic dispersing agent is preferably a dispersing agent of at least one of acrylic acid ester and methacrylic acid ester. The acrylic dispersing agent is more preferably dispersing agent of methacrylic acid butyl ester. The content of silver in the fine silver particle dispersing solution is preferably 30 to 90% by weight. The content of the polar solvent in the fine silver particle dispersing solution is preferably 5 to 70% by weight.

According to the present invention, it is possible to provide a fine silver particle dispersing solution which has a good dispersion stability of fine silver particles even if a polar solvent is used, the fine silver particle dispersing solution having a good preservation stability and a suitable viscosity, and the fine silver particle dispersing solution being capable of being sintered at a low temperature and capable of producing a silver conductive film having a low resistance.

BEST MODE FOR CARRYING OUT THE INVENTION

In a preferred embodiment of a fine silver particle dispersing solution according to the present invention, fine silver particles coated with an amine having a carbon number of 8 to 12 as an organic protective material, together with an acrylic dispersing agent, the amount of which is 1.5 to 5% by weight with respect to that of the fine silver particles, are added to a polar solvent having a boiling point of 150 to 300° C., preferably 200 to 260° C.

As the organic protective material having the carbon number of 8 to 12, there can be used octylamine, nonylamine, decylamine, dodecylamine or the like, and there is preferably used octylamine. By coating fine silver particles with such a primary amine, it is possible to prevent the sintering of the fine silver particles with each other to suitably hold the distance between the adjacent two of the fine silver particles. If the carbon number of the primary amine is greater than 12, it is required to provide a high thermal energy during the thermal decomposition thereof. On the other hand, if the carbon number is less than 8, the function of coating the fine silver particles is weakened, and it is difficult to disperse the fine silver particles, so that the fine silver particles easily form aggregated particles and the temporal stability thereof is deteriorated.

The average primary particle diameter of the fine silver particles is preferably in the range of from 1 nm to 100 nm, more preferably in the range of from 10 nm to 50 nm, and most preferably in the range of from 20 nm to 50 nm. If the average primary particle diameter is greater than 100 nm, it is difficult to obtain the low-temperature sinterability expected as the fine silver particles.

As the polar solvent having the boiling point of 150 to 300° C., there is preferably used a glycol ether solvent having an ether group or terpineol. As the glycol ether solvent, there is preferably used diethylene glycol monobutyl ether, diethylene glycol dibutyl ether or diethylene glycol monobutyl ether acetate. Furthermore, the polar solvent preferably has a solubility parameter (SP value) of 8.0 to 12.0, and more preferably has a solubility parameter of 8.5 to 11.5.

The amount of the acrylic dispersing agent to be added is in the range of from 1.5% to 5% (preferably from 1.5% to 3%) by weight with respect to that of the fine silver particles. If the amount of the acrylic dispersing agent in the fine silver particle dispersing solution exceeds 5% by weight, there is some possibility that the specific resistance value of a silver conductive film formed by using the fine silver particle dispersing solution may be increased. The acrylic dispersing agent is preferably a dispersing agent of at least one of acrylic acid ester and methacrylic acid ester. The dispersing agents preferably has an oxyalkylene group.

As the dispersing agent of methacrylic acid ester, there is preferably used a dispersing agent which has a framework of methacrylic acid butyl ester expressed by the following formula [I], which has a low molecular weight of not greater than about tens of thousands and which contains a compound having no functional groups. If the framework has a carbonyl group, it is replaced with the amine on the surface of the fine silver particles, so that the sinterability is deteriorated. If the weight-average molecular weight of the dispersing agent exceeds about tens of thousands, the viscosity thereof is too high. Therefore, the dispersing agent preferably has a low molecular weight of not greater than about tens of thousands, more preferably has a low molecular weight of not greater than 40,000, and most preferably has a low molecular weight of not greater than 25,000. As such a dispersing agent having the framework of methacrylic acid butyl ester, there can be used any one of M1400 (43% by weight of methacrylic acid butyl ester as a solid content in a solvent of diethylene glycol monobutyl ether, weight-average molecular weight of 20,000), M1200 (43% by weight of methacrylic acid butyl ester as a solid content in a solvent of diethylene glycol monobutyl ether acetate, weight-average molecular weight of 20,000) and M1000 (43% by weight of methacrylic acid butyl ester as a solid content in a solvent of terpineol, weight-average molecular weight of 20,000), which are produced by Sekisui Chemical Co., Ltd., or the like.

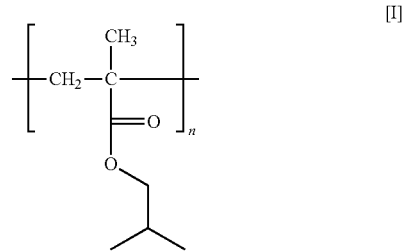

The content of silver in the fine silver particle dispersing solution is preferably 30 to 90% by weight, and more preferably 70 to 90% by weight. The content of the polar solvent in the fine silver particle dispersing solution is preferably 5 to 70% by weight, and more preferably 7 to 15% by weight.

The preferred embodiment of a fine silver particle dispersing solution according to the present invention can be produced by a method comprising the steps of: carrying out the reduction treatment of a silver compound in the presence of an amine having a carbon number of 6 to 12 serving as an organic protective material in water to obtain a water slurry containing fine silver particles coated with the organic protective material; causing the precipitation of the fine silver particles by decantation to remove supernatant; adding the obtained wet fine silver particles, together with an acrylic dispersing agent, to a polar solvent having a boiling point of 150 to 300° C.; and drying the fine silver particles and acrylic dispersing agent, which are added to the polar solvent, at a temperature of room temperature to 100° C., preferably at a temperature of not higher than 80° C., in an atmosphere of nitrogen for 12 hours or more to remove the moisture content therein. Furthermore, since the fine silver particles are sintered with each other if the drying temperature is too high, such a high temperature is not preferable.

The organic protective material is preferably added so that the molar ratio thereof to silver of the silver compound is in the range of from 0.05 to 6.

The reduction treatment is preferably carried out at a temperature of lower than 60° C., and more preferably carried out at a temperature of 10 to 50° C. When the temperature is not lower than 60° C., the fine silver particles are easily aggregated to be fusion-bonded to each other so as not to be protected with the organic protective material, so that it is not preferable that the temperature is not lower than 60° C. The reaction time in the reduction treatment is preferably not longer than 30 minutes, and more preferably not longer than 10 minutes.

The reducing agent may be any one of various reducing agents capable of reducing silver. However, if the reducing agent is an acidic reducing agent having a carbonyl group, a part of the acidic reducing agent reacts with the organic protective material to amide-bond thereto, although it is possible to obtain fine silver particles. Therefore, the reducing agent is preferably a basic reducing agent, and more preferably hydrazine or $NaBH_4$. The reducing agent is preferably added so that the molar ratio thereof to silver of the silver compound is in the range of from 0.1 to 2.0.

The silver compound is preferably a silver salt or a silver oxide, and more preferably silver nitrate. The silver compound is added so that the concentration of silver ions in the aqueous reaction solution is preferably in the range of from 0.01 mol/L to 1.0 mol/L, and more preferably in the range of from 0.03 mol/L to 0.2 mol/L.

The "average primary particle diameter" of the fine silver particles can be calculated by an image analysis software (A-image-kun (registered trademark) produced by Asahi Kasei Engineering Corporation) with respect to optionally selected 100 or more of fine silver particles on a scanning electron micrograph (SEM image) or transmission electron micrograph (TEM image) obtained by observing the fine silver particles by means of a scanning electron microscope (SEM) (S-4700 produced by Hitachi Hi-Technologies Corporation) or a transmission electron microscope (TEM) (JEM-1011 produced by Japan Electron Optics Laboratory Ltd.) at a predetermined magnification (a magnification of 180,000 by TEM when the particle diameter is not greater than 20 nm, a magnification of 80,000 by SEM when the particle diameter is greater than 20 nm and not greater than 30 nm, a magnification of 50,000 by SEM when the particle diameter is greater than 30 nm and not greater than 100 nm, a magnification of 30,000 by SEM when the particle diameter is greater than 100 nm and not greater than 300 nm, and a magnification of 10,000 by SEM when the particle diameter is greater than 300 nm).

If the fine silver particle dispersing solution is kneaded and degassed by a three-roll mill, a bead mill, a wet jet mill, an ultrasonic homogenizer or the like to prepare a fine silver particle kneaded mixture which is applied to a substrate and heated at a low temperature of about 100 to 200° C. to be burned, the fine silver particles can be sintered with each other to form a silver conductive film. If the particle size of the fine silver particles contained in the fine silver particle kneaded mixture is evaluated by a grind gate, the maximum particle diameter $D_{max}$ (first scratch) is preferably 15 μm or less, and more preferably 10 μm or less. The viscosity of the fine silver particle kneaded mixture is preferably 100 Pa·s or less, more preferably 80 Pa·s or less, at 25°C. and 5 rpm when the fine silver particle kneaded mixture is applied on a substrate by a printing method, such as the ink-jet, screen printing and gravure offset methods, in order to form a silver conductive film.

Examples of a fine silver particle dispersing solution according to the present invention will be described below in detail.

EXAMPLE 1

After pure water 3422.0 g serving as a reaction medium was put in a 5 L of reaction vessel to adjust the temperature thereof at 40°C. octylamine (special grade produced by Wako Pure Chemical Industries, Ltd., molecular weight=129.24, carbon number=8) 51.1 g serving as an organic protective material (the molar ratio of the organic protective material to Ag (number of moles of octylamine/number of moles of silver)=2), and hydrazine hydrate (80% solution produced by Otsuka Chemical Co., Ltd.) 6.2 g serving as a reducing agent (the molar ratio of the reducing agent to Ag (number of moles of hydrazine hydrate/number of moles of silver)=0.5) were added thereto, and the solution thus obtained was stirred by rotating a stirring rod having impellers at 345 rpm by means of an outside motor while blowing nitrogen gas serving as an inert gas into the solution at a flow rate of 2 L/min. Then, after an aqueous solution prepared by dissolving silver nitrate crystal (produced by Toyo Kagaku Inc.) 33.6 g serving as a silver compound in pure water 180.0 g was added thereto at a stroke, the solution was stirred for 2 minutes to obtain a water slurry containing fine silver particles coated with octylamine serving as the organic protective material.

The fine silver particles in the water slurry thus obtained were observed at a magnification of 50,000 by means of a scanning electron microscope (SEM) (S-4700 produced by Hitachi Hi-Technologies Corporation), and the average primary particle diameter of the fine silver particles was calculated by the image analysis software (A-image-kun (registered trademark) produced by Asahi Kasei Engineering Corporation) with respect to optionally selected 100 or more of fine silver particles on the SEM image. As a result, the average primary particle diameter was 35.6 nm.

Then, the fine silver particles were caused to precipitate by the decantation of the water slurry containing the fine silver particles, and then, a supernatant was removed from the water slurry to recover wet fine silver particles.

Then, the recovered wet fine silver particles (coated with octylamine) 59.9 g (65.5% by weight of fine silver particles coated with octylamine), together with a dispersing agent containing methacrylic acid butyl ester dissolved in diethylene glycol monobutyl ether (M1400 produced by Sekisui Chemical Co., Ltd.) 2.8 g serving as an acrylic dispersing agent containing solution, were added to diethylene glycol monobutyl ether (boiling point=230° C., solubility parameter (SP value)=9.5) 3.5 g serving as a polar solvent having a boiling point of 150 to 300° C. Thereafter, the fine silver particles and acrylic dispersing agent containing solution, which were added to the polar solvent, were dried at room temperature in an atmosphere of nitrogen for 24 hours to remove the moisture content therein to obtain a fine silver particle dispersing solution containing 86.2% by weight of the fine silver particles, 11.2% by weight of the polar solvent having the boiling point of 150 to 300°C., and 2.6% by weight of the acrylic dispersing agent containing solution (containing 3% by weight of the acrylic dispersing agent of methacrylic acid butyl ester being the solid content of M1400 with respect to the fine silver particles).

Then, the fine silver particle dispersing solution thus obtained was kneaded and degassed by a three-roll mill to prepare a fine silver particle kneaded mixture. The viscosity of the fine silver particle kneaded mixture was measured at 25°C. and 5 rpm by means of a viscosity measuring apparatus (HAAKE ReoStress 6000 produced by Thermo Fisher Scientific Inc.). As a result, the viscosity was 70.6 Pa·s. The particle size of the fine silver particles contained in the fine silver particle kneaded mixture was evaluated by a grind gage. As a result, the maximum particle diameter $D_{max}$ (first scratch) was 6 μm, and the fourth scratch (the fourth large particle diameter from the maximum particle diameter in the measurement of the particle diameter of the fine silver particles in the kneaded mixture using the grind gage) was less than 1 μm.

After the obtained fine silver particle dispersing solution was applied on a glass substrate so as to have a size of 10 mm square and a thickness of 30 μm by means of a metal mask, the applied fine silver particle dispersing solution was burned at 130° C. for 30 minutes by a hot-air dryer (DKM400 produced by Yamato Scientific Co., Ltd.) to sinter the fine silver particles to form a silver conductive film on the glass substrate. The specific resistance value of the silver conductive film was calculated from the surface resistance thereof, which was measured by a surface resistance measuring apparatus (SURFCOM 1500DX produced by Toyo Precision Parts MFG Co., Ltd.), and the thickness thereof which was obtained by a thickness measuring apparatus. As a result, the specific resistance value was 11.5 μΩ·cm.

The obtained fine silver particle dispersing solution was dried to be observed by a scanning electron microscope (SEM), and it was observed by SEM to be compared after it was preserved at 25°C. in the atmosphere for three days. As a result, the fine silver particles were hardly aggregated even after three days, so that it was found that the fine silver particle dispersing solution has a good preservation stability.

EXAMPLE 2

A fine silver particle dispersing solution containing 86.2% by weight of fine silver particles, 12.5% by weight of a polar solvent having a boiling point of 150 to 300°C., and 1.3% by weight of an acrylic dispersing agent containing solution (containing 1.5% by weight of an acrylic dispersing agent of methacrylic acid butyl ester being the solid content of M1400 with respect to the fine silver particles) was obtained by the same method as that in Example 1, except that the amount of diethylene glycol monobutyl ether to be added as the polar solvent having the boiling point 150 to 300° C. was 4.9 g and that the amount of the acrylic dispersing agent containing solution to be added was 1.4 g.

From the fine silver particle dispersing solution thus obtained, a fine silver particle kneaded mixture was prepared by the same method as that in Example 1. The viscosity of the fine silver particle kneaded mixture was measured by the same method as that in Example 1. As a result, the viscosity was 52.3 Pa·s. The particle size of the fine silver particles contained in the fine silver particle kneaded mixture was evaluated by the grind gage. As a result, the maximum particle size $D_{max}$ (first scratch) was 3 μm, and the fourth scratch was less than 1 μm. The specific resistance value of a silver conductive film formed from the obtained fine silver particle dispersing solution by the same method as that in Example 1 was calculated by the same method as that in Example 1. As a result, the specific resistance value was 5.6 μΩ·cm.

The obtained fine silver particle dispersing solution was observed and compared by SEM by the same method as that in Example 1. As a result, the fine silver particles were hardly aggregated even after three days, so that it was found that the fine silver particle dispersing solution has a good preservation stability.

EXAMPLE 3

A fine silver particle dispersing solution containing 86.2% by weight of fine silver particles, 11.2% by weight of a polar solvent having a boiling point of 150 to 300° C., and 2.6% by weight of an acrylic dispersing agent containing solution (containing 3% by weight of an acrylic dispersing agent of methacrylic acid butyl ester being the solid content of M1400 with respect to the fine silver particles) was obtained by the same method as that in Example 1, except that diethylene glycol dibutyl ether (boiling point=255° C., SP value=9.5) was substituted for diethylene glycol monobutyl ether serving as the polar solvent having the boiling point of 150 to 300° C.

From the fine silver particle dispersing solution thus obtained, a fine silver particle kneaded mixture was prepared by the same method as that in Example 1. The viscosity of the fine silver particle kneaded mixture was measured by the same method as that in Example 1. As a result, the viscosity was 78.4 Pa·s. The particle size of the fine silver particles contained in the fine silver particle kneaded mixture was evaluated by the grind gage. As a result, the maximum particle size $D_{max}$ (first scratch) was 10 μm, and the fourth scratch was 6 μm. The specific resistance value of a silver conductive film formed from the obtained fine silver particle dispersing solution by the same method as that in Example 1 was calculated by the same method as that in Example 1. As a result, the specific resistance value was 10.3 μΩ·cm.

The obtained fine silver particle dispersing solution was observed and compared by SEM by the same method as that in Example 1. As a result, the fine silver particles were hardly aggregated even after three days, so that it was found that the fine silver particle dispersing solution has a good preservation stability.

EXAMPLE 4

A fine silver particle dispersing solution containing 86.2% by weight of fine silver particles, 11.2% by weight of a polar solvent having a boiling point of 150 to 300° C., and 2.6% by weight of an acrylic dispersing agent containing solution (containing 3% by weight of an acrylic dispersing agent of methacrylic acid butyl ester being the solid content of M1200 with respect to the fine silver particles) was obtained by the same method as that in Example 1, except that diethylene glycol monobutyl ether acetate (boiling point=247° C., SP value=8.9) was substituted for diethylene glycol monobutyl ether serving as the polar solvent having the boiling point of 150 to 300°C. and that the acrylic dispersing agent containing solution (M1200 produced by Sekisui Chemical Co., Ltd.) was substituted for the dispersing solution (M1400 produced by Sekisui Chemical Co., Ltd.) containing methacrylic acid butyl ester dissolved in diethylene glycol monobutyl ether acetate.

From the fine silver particle dispersing solution thus obtained, a fine silver particle kneaded mixture was prepared by the same method as that in Example 1. The viscosity of the fine silver particle kneaded mixture was measured by the same method as that in Example 1. As a result, the viscosity was 40.2 Pa·s. The particle size of the fine silver particles contained in the fine silver particle kneaded mixture was evaluated by the grind gage. As a result, the maximum particle size $D_{max}$ (first scratch) was 6 μm, and the fourth scratch was less than 1 μm. The specific resistance value of a silver conductive film formed from the obtained fine silver particle dispersing solution by the same method as that in Example 1 was calculated by the same method as that in Example 1. As a result, the specific resistance value was 5.7 μΩ·cm.

The obtained fine silver particle dispersing solution was observed and compared by SEM by the same method as that in Example 1. As a result, the fine silver particles were hardly aggregated even after three days, so that it was found that the fine silver particle dispersing solution has a good preservation stability.

EXAMPLE 5

A fine silver particle dispersing solution containing 86.2% by weight of fine silver particles, 11.2% by weight of a polar solvent having a boiling point of 150 to 300° C., and 2.6% by weight of an acrylic dispersing agent containing solution (containing 3% by weight of an acrylic dispersing agent of methacrylic acid butyl ester being the solid content of M1000 with respect to the fine silver particles) was obtained by the same method as that in Example 1, except that terpineol (boiling point=217° C., SP value=11.1) was substituted for diethylene glycol monobutyl ether serving as the polar solvent having the boiling point of 150 to 300°C. and that a dispersing solution (M1000 produced by Sekisui Chemical Co., Ltd.) containing methacrylic acid butyl ester dissolved in terpineol was used as the acrylic dispersing agent containing solution in place of the acrylic dispersing agent containing solution (M1400 produced by Sekisui Chemical Co., Ltd.).

From the fine silver particle dispersing solution thus obtained, a fine silver particle kneaded mixture was prepared by the same method as that in Example 1. The viscosity of the fine silver particle kneaded mixture was measured by the same method as that in Example 1. As a result, the viscosity was 35.0 Pa·s. The particle size of the fine silver particles contained in the fine silver particle kneaded mixture was evaluated by the grind gage. As a result, the maximum particle size $D_{max}$ (first scratch) was 6 μm, and the fourth scratch was less than 1 μm. The specific resistance value of a silver conductive film formed from the obtained fine silver particle dispersing solution by the same method as that in Example 1 was calculated by the same method as that in Example 1. As a result, the specific resistance value was 6.2 μΩ·cm.

The obtained fine silver particle dispersing solution was observed and compared by SEM by the same method as that in Example 1. As a result, the fine silver particles were hardly aggregated even after three days, so that it was found that the fine silver particle dispersing solution has a good preservation stability.

EXAMPLE 6

After pure water 3422.0 g serving as a reaction medium was put in a 5 L of reaction vessel to adjust the temperature thereof at 40° C., octylamine (special grade produced by Wako Pure Chemical Industries, Ltd., molecular weight=129.24, carbon number=8) 51.1 g serving as an organic protective material (the molar ratio of the organic protective material to Ag=2), and hydrazine hydrate (80% solution produced by Otsuka Chemical Co., Ltd.) 12.4 g serving as a reducing agent (the molar ratio of the reducing agent to Ag=1) were added thereto, and the solution thus obtained was stirred by rotating a stirring rod having impellers at 345 rpm by means of an outside motor while blowing nitrogen gas serving as an inert gas into the solution at a flow rate of 2 L/min. Then, after an aqueous solution prepared by dissolving silver nitrate crystal (produced by Toyo Kagaku Inc.) 33.6 g serving as a silver compound and 28% by weight of an ammonia water (special grade produced by Wako Pure Chemical Industries, Ltd.) 55.2 g in pure water 180.0 g was added thereto at a stroke, the solution was stirred for 2 minutes to obtain a water slurry containing fine silver particles coated with octylamine serving as the organic protective material.

The average primary particle diameter of the fine silver particles in the water slurry thus obtained was calculated by the same method as that in Example 1. As a result, the average primary particle diameter was 87.5 nm.

Then, the fine silver particles were caused to precipitate by the decantation of the water slurry of the fine silver particles, and then, a supermatant was removed from the water slurry to recover wet fine silver particles.

Then, the recovered wet fine silver particles (coated with octylamine) 59.9 g (66.9% by weight of fine silver particles coated with octylamine), together with an acrylic dispersing agent containing solution (M1400 produced by Sekisui Chemical Co., Ltd.) 1.4 g, were added to diethylene glycol monobutyl ether (boiling point=230° C., SP value=9.5) 5.0 g serving as a polar solvent having a boiling point of 150 to 300° C. Thereafter, the fine silver particles and acrylic dispersing agent, which were added to the polar solvent, were dried at room temperature in an atmosphere of nitrogen for 24 hours to remove the moisture content therein to obtain a fine silver particle dispersing solution containing 86.2% by weight of the fine silver particles, 12.5% by weight of the polar solvent having the boiling point of 150 to 300°C., and 1.3% by weight of the acrylic dispersing agent containing solution (containing 1.5% by weight of the acrylic dispersing agent of methacrylic acid butyl ester being the solid content of M1400 with respect to the fine silver particles).

From the fine silver particle dispersing solution thus obtained, a fine silver particle kneaded mixture was prepared by the same method as that in Example 1. The viscosity of the fine silver particle kneaded mixture was measured by the same method as that in Example 1. As a result, the viscosity was 35.2 Pa·s. The particle size of the fine silver particles contained in the fine silver particle kneaded mixture was evaluated by the grind gage. As a result, the maximum particle size $D_{max}$ (first scratch) was 13 μm, and the fourth scratch was less than 1 μm. The specific resistance value of a silver conductive film formed from the obtained fine silver particle dispersing solution by the same method as that in Example 1 was calculated by the same method as that in Example 1. As a result, the specific resistance value was 6.3 μΩ·cm.

The obtained fine silver particle dispersing solution was observed and compared by SEM by the same method as that in Example 1. As a result, the fine silver particles were hardly aggregated even after three days, so that it was found that the fine silver particle dispersing solution has a good preservation stability.

EXAMPLE 7

The wet fine silver particles (coated with octylamine) 59.9 g (65.5% by weight of fine silver particles coated with octylamine) recovered by the same method as that in Example 1, together with an acrylic dispersing agent containing solution (M1400 produced by Sekisui Chemical Co., Ltd.) 2.8 g, were added to diethylene glycol monobutyl ether (boiling point=230° C., SP value=9.5) 9.5 g serving as a polar solvent having a boiling point of 150 to 300° C. Thereafter, the fine silver particles and acrylic dispersing agent, which were added to the polar solvent, were dried at room temperature in an atmosphere of nitrogen for 24 hours to remove the moisture content therein to obtain a fine silver particle dispersing solution containing 76.1% by weight of the fine silver particles, 21.6% by weight of the polar solvent having the boiling point of 150 to 300°C., and 2.3% by weight of the acrylic dispersing agent containing solution (containing 3% by weight of the acrylic dispersing agent of methacrylic acid butyl ester being the solid content of M1400 with respect to the fine silver particles).

From the fine silver particle dispersing solution thus obtained, a fine silver particle kneaded mixture was prepared by the same method as that in Example 1. The viscosity of the fine silver particle kneaded mixture was measured by the same method as that in Example 1. As a result, the viscosity was 0.65 Pa·s. The particle size of the fine silver particles contained in the fine silver particle kneaded mixture was evaluated by the grind gage. As a result, the maximum particle size $D_{max}$ (first scratch) was 9 μm, and the fourth scratch was less than 1 μm. The specific resistance value of a silver conductive film formed from the obtained fine silver particle dispersing solution by the same method as that in Example 1 was calculated by the same method as that in Example 1. As a result, the specific resistance value was 9.0 μΩ·cm.

The obtained fine silver particle dispersing solution was observed and compared by SEM by the same method as that in Example 1. As a result, the fine silver particles were hardly aggregated even after three days, so that it was found that the fine silver particle dispersing solution has a good preservation stability.

EXAMPLE 8

The wet fine silver particles (coated with octylamine) 59.9 g (65.5% by weight of fine silver particles coated with octylamine) recovered by the same method as that in Example 1, together with an acrylic dispersing agent containing solution (M1400 produced by Sekisui Chemical Co., Ltd.) 2.8 g, were added to diethylene glycol monobutyl ether (boiling point=230°C., SP value=9.5) 17.5 g serving as a polar solvent having a boiling point of 150 to 300° C. Thereafter, the fine silver particles and acrylic dispersing agent, which were added to the polar solvent, were dried at room temperature in an atmosphere of nitrogen for 24 hours to remove the Moisture content therein to obtain a fine silver particle dispersing solution containing 65.9% by weight of the fine silver particles, 32.1% by weight of the polar solvent having the boiling point of 150 to 300°C., and 2.0% by weight of the acrylic dispersing agent containing solution (containing 3% by weight of the acrylic dispersing agent of methacrylic acid butyl ester being the solid content of M1400 with respect to the fine silver particles).

From the fine silver particle dispersing solution thus obtained, a fine silver particle kneaded mixture was prepared by the same method as that in Example 1. The viscosity of the fine silver particle kneaded mixture was measured by the same method as that in Example 1. As a result, the viscosity was 0.04 Pa·s. The particle size of the fine silver particles contained in the fine silver particle kneaded mixture was evaluated by the grind gage. As a result, the maximum particle size $D_{max}$ (first scratch) was less than 1 µm, and the fourth scratch was less than 1 µm. The specific resistance value of a silver conductive film formed from the obtained fine silver particle dispersing solution by the same method as that in Example 1 was calculated by the same method as that in Example 1. As a result, the specific resistance value was 7.6 µΩ·cm.

The obtained fine silver particle dispersing solution was observed and compared by SEM by the same method as that in Example 1. As a result, the fine silver particles were hardly aggregated even after three days, so that it was found that the fine silver particle dispersing solution has a good preservation stability.

COMPARATIVE EXAMPLE 1

A fine silver particle dispersing solution containing 86.2% by weight of fine silver particles and 13.8% by weight of a polar solvent having a boiling point of 150 to 300° C. was obtained by the same method as that in Example 1, except that the amount of diethylene glycol monobutyl ether to be added as the polar solvent having the boiling point of 150 to 300°C. was 6.3 g and that the acrylic dispersing agent containing solution was not added.

From the fine silver particle dispersing solution thus obtained, a fine silver particle kneaded mixture was prepared by the same method as that in Example 1. It was attempted to measure the viscosity of the fine silver particle kneaded mixture by the same method as that in Example 1, but it was not possible to measure the viscosity since it was too high. The particle size of the fine silver particles contained in the fine silver particle kneaded mixture was evaluated by the grind gage. As a result, the maximum particle size $D_{max}$ (first scratch) was not less than 50 µm, and the fourth scratch was 40 µm.

The obtained fine silver particle dispersing solution was observed and compared by SEM by the same method as that in Example 1. As a result, the fine silver particles were hardly aggregated even after three days, so that it was found that the fine silver particle dispersing solution has a good preservation stability.

COMPARATIVE EXAMPLE 2

A water slurry containing fine silver particles coated with hexylamine serving as the organic protective material was obtained by the same method as that in Example 1, except that hexylamine (special grade produced by Wako Pure Chemical Industries, Ltd., molecular weight=101.19, carbon number=6) 39.6 g (the molar ratio of the organic protective material to Ag=2) was substituted for octylamine serving as the organic protective material. The average primary particle diameter of the fine silver particles in the water slurry thus obtained was calculated by the same method as that in Example 1. As a result, the average primary particle diameter was 32.1 nm. Then, from the water slurry containing the fine silver particles thus obtained, there was obtained a fine silver particle dispersing solution containing 86.2% by weight of the fine silver particles, 11.2% by weight of the polar solvent having a boiling point of 150 to 300° C., and 2.6% by weight of the acrylic dispersing agent containing solution (containing 3% by weight of the acrylic dispersing agent of methacrylic acid butyl ester being the solid content of M1400 with respect to the fine silver particles).

From the fine silver particle dispersing solution thus obtained, a fine silver particle kneaded mixture was prepared by the same method as that in Example 1. The viscosity of the fine silver particle kneaded mixture was measured by the same method as that in Example 1. As a result, the viscosity was 61.7 Pa·s. The particle size of the fine silver particles contained in the fine silver particle kneaded mixture was evaluated by the grind gage. As a result, the maximum particle size $D_{max}$ (first scratch) was 10 µm, and the fourth scratch was 3 µm. The specific resistance value of a silver conductive film formed from the obtained fine silver particle dispersing solution by the same method as that in Example 1 was calculated by the same method as that in Example 1. As a result, the specific resistance value was 7.3 µΩ·cm.

The obtained fine silver particle dispersing solution was observed and compared by SEM by the same method as that in Example 1. As a result, the fine silver particles were aggregated after three days, so that it was found that the fine silver particle dispersing solution has a bad preservation stability.

COMPARATIVE EXAMPLE 3

After pure water 3422.0 g serving as a reaction medium was put in a 5 L of reaction vessel to adjust the temperature thereof at 40° C. oleylamine (special grade produced by Wako Pure Chemical Industries, Ltd., molecular weight=267.47, carbon number=18) 105.8 g serving as an organic protective material (the molar ratio of the organic protective material to Ag=2), and an aqueous solution prepared by dissolving silver nitrate crystal (produced by Toyo Kagaku Inc.) 33.6 g serving as a silver compound in pure water 180.0 g were added thereto, and the solution thus obtained was stirred by rotating a stirring rod having impellers at 345 rpm by means of an outside motor while blowing nitrogen gas serving as an inert gas into the solution at a flow rate of 2 L/min. Then, after an aqueous solution prepared by dissolving NaBH$_4$ (special grade produced by Wako Pure Chemical Industries, Ltd.) 2.8 g serving as a reducing agent (the molar ratio of the reducing agent to Ag=1.5) in 40% by weight of an aqueous sodium hydroxide solution 20.6 g was added thereto at a stroke, the solution was stirred for 2 minutes to obtain a water slurry containing fine silver particles coated with oleylamine serving as the organic protective material. The average primary particle diameter of the fine silver particles in the water slurry thus obtained was calculated by the same method as that in Example 1. As a result, the average primary particle diameter was 24.3 nm. Then, from the water slurry containing the fine silver particles thus obtained, there was obtained a fine silver particle dispersing solution containing 86.2% by weight of the fine silver particles, 11.2% by weight of the polar solvent having the boiling point of 150 to 300° C., and 2.6% by weight of the acrylic dispersing agent containing solution (containing 3% by weight of the acrylic dispersing agent of methacrylic acid butyl ester being the solid content of M1400 with respect to the fine silver particles).

From the fine silver particle dispersing solution thus obtained, a fine silver particle kneaded mixture was prepared by the same method as that in Example 1. The viscosity of the fine silver particle kneaded mixture was measured by the same method as that in Example 1. As a result, the viscosity was 169.8 Pa·s. The particle size of the fine silver particles contained in the fine silver particle kneaded mixture was evaluated by the grind gage. As a result, the maximum particle size $D_{max}$ (first scratch) was 25 µm, and the fourth scratch was 8 µm. The specific resistance value of a silver conductive film formed from the obtained fine silver particle dispersing solution by the same method as that in Example 1 was calculated by the same method as that in Example 1. As a result, the specific resistance value was 411.2 µΩ·cm.

COMPARATIVE EXAMPLE 4

A fine silver particle dispersing solution containing 86.2% by weight of fine silver particles, 11.2% by weight of a glycol ether solvent, and 2.6% by weight of a polyurethane dispersing agent containing solution (containing 3% by weight of a dispersing agent of urethane modified polyester being the solid content of UR8300 with respect to the fine silver particles) was obtained by the same method as that in Example 1, except that a polyurethane dispersing agent solution (Byron UR8300 produced by Toyobo Co., Ltd., 30% by weight of a solid content in methyl ethyl ketone/toluene (50% by weight/50% by weight) solvent) 4.0 g was substituted for the acrylic dispersing agent containing solution (M1400 produced by Sekisui Chemical Co., Ltd.).

From the fine silver particle dispersing solution thus obtained, a fine silver particle kneaded mixture was prepared by the same method as that in Example 1. The viscosity of the fine silver particle kneaded mixture was measured by the same method as that in Example 1. As a result, the viscosity was 338.4 Pa·s. The particle size of the fine silver particles contained in the fine silver particle kneaded mixture was evaluated by the grind gage. As a result, the maximum particle size $D_{max}$ (first scratch) was 12 µm, and the fourth scratch was 3 µm. The specific resistance value of a silver conductive film formed from the obtained fine silver particle dispersing solution by the same method as that in Example 1 was calculated by the same method as that in Example 1. As a result, the specific resistance value was 8.8 µΩ·cm.

COMPARATIVE EXAMPLE 5

A fine silver particle dispersing solution containing 86.0% by weight of fine silver particles, 13.2% by weight of a polar solvent having a boiling point of 150 to 300°C., and 0.8% by weight of an acrylic dispersing agent containing solution (containing 1% by weight of an acrylic dispersing agent of methacrylic acid butyl ester being the solid content of M1400 with respect to the fine silver particles) was obtained by the same method as that in Example 1, except that the amount of diethylene glycol monobutyl ether added as the polar solvent having the boiling point 150 to 300° C. was 5.5 g and that the amount of the acrylic dispersing agent containing solution (M1400 produced by Sekisui Chemical Co., Ltd.) to be added was 0.9 g.

From the fine silver particle dispersing solution thus obtained, a fine silver particle kneaded mixture was prepared by the same method as that in Example 1. The viscosity of the fine silver particle kneaded mixture was measured by the same method as that in Example 1. As a result, the viscosity was 121.0 Pa·s. The particle size of the fine silver particles contained in the fine silver particle kneaded mixture was evaluated by the grind gage. As a result, the maximum particle size $D_{max}$ (first scratch) was 22 µm, and the fourth scratch was 4 µm. The specific resistance value of a silver conductive film formed from the obtained fine silver particle dispersing solution by the same method as that in Example 1 was calculated by the same method as that in Example 1. As a result, the specific resistance value was 4.9 µΩ·cm.

COMPARATIVE EXAMPLE 6

After pure water 3422.0 g serving as a reaction medium was put in a 5 L of reaction vessel to adjust the temperature thereof at 40°C., octylamine (special grade produced by Wako Pure Chemical Industries, Ltd., molecular weight=129.24, carbon number=8) 51.1 g serving as an organic protective material (the molar ratio of the organic protective material to Ag=2), hydrazine hydrate (80% solution produced by Otsuka Chemical Co., Ltd.) 6.2 g serving as a reducing agent (the molar ratio of the reducing agent to Ag=2), and 50% by weight of an aqueous sodium hydroxide solution (produced by Wako Pure Chemical Industries, Ltd.) 26 g were added thereto, and the solution thus obtained was stirred by rotating a stirring rod having impellers at 345 rpm by means of an outside motor while blowing nitrogen gas serving as an inert gas into the solution at a flow rate of 2 L/min. Then, after an aqueous solution prepared by dissolving silver nitrate crystal (produced by Toyo Kagaku Inc.) 33.6 g serving as a silver compound in pure water 180.0 g was added thereto at a stroke, the solution was stirred for 2 minutes to obtain a water slurry containing fine silver particles coated with octylamine serving as the organic protective material.

The average primary particle diameter of the fine silver particles in the water slurry thus obtained was calculated by the same method as that in Example 1, except that the magnification of the scanning electron microscope was 180,000. As a result, the average primary particle diameter was 18.3 nm.

Then, the fine silver particles were caused to precipitate by the decantation of the water slurry of the fine silver particles, and then, a supermatant was removed from the water slurry to recover wet fine silver particles.

Then, the recovered wet fine silver particles (coated with octylamine) 59.9 g (51.8% by weight of the fine silver particles coated with octylamine), together with an acrylic dispersing agent containing solution (M1400 produced by Sekisui Chemical Co., Ltd.) 6.3 g, were added to diethylene glycol monobutyl ether (boiling point=230° C., SP value=9.5) 0.4 g serving as a polar solvent having a boiling point of 150 to 300°C. Thereafter, the fine silver particles and acrylic dispersing agent, which were added to the polar solvent, were dried at room temperature in an atmosphere of nitrogen for 24 hours to remove the moisture content therein to obtain a fine silver particle dispersing solution containing 82.2% by weight of the fine silver particles, 10.6% by weight of the polar solvent having the boiling point of 150 to 300° C., and 7.2% by weight of the acrylic dispersing agent containing solution (containing 8% by weight of the acrylic dispersing agent of methacrylic acid butyl ester being the solid content of M1400 with respect to the fine silver particles).

From the fine silver particle dispersing solution thus obtained, a fine silver particle kneaded mixture was prepared by the same method as that in Example 1. The viscosity of the fine silver particle kneaded mixture was measured by the same method as that in Example 1. As a result, the viscosity was 61.9 Pa·s. The particle size of the fine silver particles contained in the fine silver particle kneaded mixture was evaluated by the grind gage. As a result, the Maximum particle size $D_{max}$ (first scratch) was 2 μm, and the fourth scratch was less than 1 μm. The specific resistance value of a silver conductive film formed from the obtained fine silver particle dispersing solution by the same method as that in Example 1 was not able to be measured due to overload (OL), so that it was not possible to calculate the specific resistance value of the silver conductive film.

COMPARATIVE EXAMPLE 7

A fine silver particle dispersing solution containing 86.2% by weight of fine silver particles, 11.2% by weight of a polar solvent having a boiling point of 150 to 300° C., and 2.6% by weight of an acrylic dispersing agent containing solution (containing 3% by weight of an acrylic dispersing agent of methacrylic acid butyl ester being the solid content of M1400 with respect to the fine silver particles) was obtained by the same method as that in Example 1, except that ethylene glycol (boiling point=197° C., SP value=14.6) was substituted for diethylene glycol monobutyl ether serving as the polar solvent having the boiling point of 150 to 300°C.

From the fine silver particle dispersing solution thus obtained, it was attempted to prepare a fine silver particle kneaded mixture by the same method as that in Example 1, but it was not possible to prepare any mixture as a paste since it was separated.

The results in these examples and comparative examples are shown in Tables 1-3.

TABLE 1

| | Organic Protective Agent | | Particle |
|---|---|---|---|
| | Type | Carbon Number | Diameter (nm) |
| Example 1 | octylamine | 8 | 35.6 |
| Example 2 | octylamine | 8 | 35.6 |
| Example 3 | octylamine | 8 | 35.6 |
| Example 4 | octylamine | 8 | 35.6 |
| Example 5 | octylamine | 8 | 35.6 |
| Example 6 | octylamine | 8 | 87.5 |
| Example 7 | octylamine | 8 | 35.6 |
| Example 8 | octylamine | 8 | 35.6 |
| Comp. 1 | octylamine | 8 | 35.6 |
| Comp. 2 | hexylamine | 6 | 32.1 |
| Comp. 3 | oleylamine | 18 | 24.3 |
| Comp. 4 | octylamine | 8 | 35.6 |
| Comp. 5 | octylamine | 8 | 35.6 |
| Comp. 6 | octylamine | 8 | 18.3 |
| Comp. 7 | octylamine | 8 | 35.6 |

TABLE 2

| | Ag | Solvent | | Dispersing Agent | |
|---|---|---|---|---|---|
| | Content (wt %) | Type | Amount (wt %) | Type | Amount (wt %) |
| Ex. 1 | 86.2 | diethylene glycol monobutyl ether | 11.2 | acrylic (M1400) | 2.6 |
| Ex. 2 | 86.2 | diethylene glycol monobutyl ether | 12.5 | acrylic (M1400) | 1.3 |
| Ex. 3 | 86.2 | diethylene glycol dibutyl ether | 11.2 | acrylic (M1400) | 2.6 |
| Ex. 4 | 86.2 | diethylene glycol monobutyl ether acetate | 11.2 | acrylic (M1200) | 2.6 |
| Ex. 5 | 86.2 | terpineol | 11.2 | acrylic (M1000) | 2.6 |
| Ex. 6 | 86.2 | diethylene glycol monobutyl ether | 12.5 | acrylic (M1400) | 1.3 |
| Ex. 7 | 76.1 | diethylene glycol monobutyl ether | 21.6 | acrylic (M1400) | 2.3 |
| Ex. 8 | 65.9 | diethylene glycol monobutyl ether | 32.1 | acrylic (M1400) | 2.0 |
| Comp. 1 | 86.2 | diethylene glycol monobutyl ether- | 13.8 | — | — |
| Comp. 2 | 86.2 | diethylene glycol monobutyl ether | 11.2 | acrylic (M1400) | 2.6 |
| Comp. 3 | 86.2 | diethylene glycol monobutyl ether | 11.2 | acrylic (M1400) | 2.6 |
| Com. 4 | 86.2 | diethylene glycol monobutyl ether | 11.2 | polyester urethane (Byron UR8300) | 2.6 |
| Comp. 5 | 86.0 | diethylene glycol monobutyl ether | 13.2 | acrylic (M1400) | 0.8 |
| Comp. 6 | 82.2 | diethylene glycol monobutyl ether | 10.6 | acrylic (M1400) | 7.2 |
| Comp. 7 | 86.2 | ethylene glycol | 11.2 | acrylic (M1400) | 2.6 |

TABLE 3

| | Viscosity | Particle Size 1st (μm) | Particle Size 4th (μm) | Initial Resistance (μΩ · cm) |
|---|---|---|---|---|
| Ex. 1 | 70.6 | 6 | <1 | 11.5 |
| Ex. 2 | 52.3 | 3 | <1 | 5.6 |
| Ex. 3 | 78.4 | 10 | 6 | 10.3 |
| Ex. 4 | 40.2 | 6 | <1 | 5.7 |
| Ex. 5 | 35.0 | 6 | <1 | 6.2 |
| Ex. 6 | 35.2 | 13 | <1 | 6.3 |
| Ex. 7 | 0.65 | 9 | <1 | 9.0 |
| Ex. 8 | 0.04 | <1 | <1 | 7.6 |
| Comp. 1 | Unmeasurable | >50 | 40 | — |
| Comp. 2 | 61.67 | 10 | 3 | 7.3 |
| Comp. 3 | 169.8 | 25 | 8 | 411.2 |
| Comp. 4 | 338.4 | 12 | 3 | 8.8 |
| Comp. 5 | 121 | 22 | 4 | 4.9 |
| Comp. 6 | 61.9 | 2 | <1 | OL |
| Comp. 7 | Unpastable | | | |

The invention claimed is:

1. A fine silver particle dispersing solution comprising:
   a polar solvent having a boiling point of 150 to 300° C. and having a solubility parameter (SP value) of 8.0 to 12.0;
   fine silver particles coated with an amine having a carbon number of 8 to 12 as an organic protective material, the fine silver particles being added to the polar solvent; and
   an acrylic dispersing agent added to the polar solvent, the amount of the acrylic dispersing agent being in the range of from 1.5% to (2.0×100/65.9) % by weight with respect to that of the fine silver particles.

2. A fine silver particle dispersing solution as set forth in claim 1, wherein said amine is octylamine.

3. A fine silver particle dispersing solution as set forth in claim 1, wherein said fine silver particles have an average primary particle diameter of 1 to 100 nm.

4. A fine silver particle dispersing solution as set forth in claim 1, wherein said polar solvent having the boiling point of 150 to 300° C. is terpineol.

5. A fine silver particle dispersing solution as set forth in claim 1, wherein said polar solvent having the boiling point of 150 to 300° C. is diethylene glycol monobutyl ether, diethylene glycol dibutyl ether or diethylene glycol monobutyl ether acetate.

6. A fine silver particle dispersing solution as set forth in claim 1, wherein said acrylic dispersing agent is a dispersing agent of at least one of acrylic acid ester and methacrylic acid ester.

7. A fine silver particle dispersing solution as set forth in claim 1, wherein said acrylic dispersing agent is a dispersing agent of methacrylic acid butyl ester.

8. A fine silver particle dispersing solution as set forth in claim 1, wherein the content of silver in said fine silver particle dispersing solution is 30 to 90% by weight.

9. A fine silver particle dispersing solution as set forth in claim 1, wherein the content of said polar solvent in said fine silver particle dispersing solution is 5 to 70% by weight.

10. A fine silver particle dispersing solution as set forth in claim 1, wherein the amount of said acrylic dispersing agent is in the range of from 1.5% to 3% by weight with respect to that of the fine silver particles.

* * * * *